(12) United States Patent
Kelleher

(10) Patent No.: US 6,757,767 B1
(45) Date of Patent: Jun. 29, 2004

(54) METHOD FOR ACCELERATION OF STORAGE DEVICES BY RETURNING SLIGHTLY EARLY WRITE STATUS

(75) Inventor: Terence M. Kelleher, Ithaca, NY (US)

(73) Assignee: Advanced Digital Information Corporation, Redmond, WA (US)

( * ) Notice: Subject to any disclaimer, the term of this patent is extended or adjusted under 35 U.S.C. 154(b) by 417 days.

(21) Appl. No.: 09/583,598

(22) Filed: May 31, 2000

(51) Int. Cl.[7] .............................................. G06F 13/00
(52) U.S. Cl. ...................................... 710/107; 710/5
(58) Field of Search ............................. 710/50, 5, 107, 710/263, 29, 310, 306; 714/748; 711/156

(56) References Cited

U.S. PATENT DOCUMENTS

| | | | |
|---|---|---|---|
| 5,327,535 A | | 7/1994 | Ogata et al. |
| 5,668,971 A | | 9/1997 | Neufeld |
| 5,781,803 A | * | 7/1998 | Krakirian ..................... 710/74 |
| 5,961,621 A | * | 10/1999 | Wu et al. .................... 710/107 |
| 6,032,234 A | * | 2/2000 | Kishi ......................... 711/156 |
| 6,081,859 A | * | 6/2000 | Munguia ..................... 710/107 |
| 6,157,962 A | * | 12/2000 | Hodges et al. ................. 710/1 |
| 6,260,095 B1 | * | 7/2001 | Goodrum ..................... 710/310 |
| 6,289,398 B1 | * | 9/2001 | Stallmo et al. ................ 710/5 |
| 6,477,591 B1 | * | 11/2002 | VanderSpek ................. 710/38 |
| 2002/0013866 A1 | * | 1/2002 | Noeldner et al. ............. 710/22 |

* cited by examiner

*Primary Examiner*—Khanh Dang
*Assistant Examiner*—Kim T. Huynh
(74) *Attorney, Agent, or Firm*—Perkins Coie LLP

(57) ABSTRACT

The present invention features a method for improving data flow from a host initiator on a first data bus to a target tape storage device on a second data bus, both buses being connected to one another by an I/O bridge or gateway. The inventive method allows the I/O bridge to return a slightly early write completion status to the host initiator before data is transmitted to the tape storage device and before the tape write operation is physically complete. The host initiator may then issue additional tape write commands and data may actually be transferred to buffer memory of the I/O bridge or gateway before the first tape write operation has been completed. This improves data throughput between host initiators and target tape storage devices, particularly in a storage area network (SAN).

16 Claims, 4 Drawing Sheets

METHOD FOR ACCELERATION OF STORAGE DEVICES BY RETURNING SLIGHTLY EARLY WRITE STATUS

FIELD OF THE INVENTION

The present invention relates to data storage devices and, more specifically, to slightly early status return from tape storage devices in a storage area network (SAN).

BACKGROUND OF THE INVENTION

Tape storage devices are widely used in data processing systems because they provide inexpensive bulk data storage. As networked computing has evolved, there has been a need to make central mass storage devices, such as disk drives or tape storage devices, accessible to all users on a network. A storage area network (SAN) is one such way of providing such an arrangement. SANs are well known to those skilled in the networking art. A device such as a SAN bridge or gateway is often utilized to interconnect a number of host initiating computers (e.g., workstations) on a Fibre Channel or similar bus to a plurality of target storage devices, often on one or more SCSI buses.

It is important that each initiator on the SAN receive status information back from a target storage device. This allows a host initiator to recover from any problem(e.g., a full disk, an end-of-tape condition, etc.) at the target storage device. Because SANs typically act as an intermediate endpoint between the initiator host and a particular target storage device, the SAN devices such as I/O bridges and gateways generally contain buffer memory. This allows a host initiator on a Fiber Channel bus to communicate with the I/O bridge or gateway at a typical speed of 100 Mbs. The I/O bridge or gateway, on the other hand, may be limited to 20 Mbs communication with a storage device on a SCSI bus.

While the buffer capability of the I/O bridge solves the communication speed difference problem, it adversely affects timely target storage device status returned to the host initiator(s). The delay in returning device status is particularly pronounced in sequential access devices such as tape drives, printers, scanners, CD ROM drives and optical disk drives, which typically transfer data more slowly than do random access devices such as disk drives. Sequential access device refers to any target device which either stores data in a sequential method, such as a tape drive, or which expect to receive data in a sequential stream, such as a processor, controller, printer, writable CDROM or optical disk drive.

Tape drive control systems have previously been configured so as to return an early status for write operations. Once the data was written into the tape storage devices' buffer, it was anticipated that the tape write operation would complete successfully. Based on this assumption, a "good" status was returned, albeit before the actual data was physically written to the tape. Because the status was returned, the host initiator could issue the next tape write command. Problems arose when, in actuality, the tape write operation was not successfully completed. Storage devices then typically posted a deferred "failed" status on a later command. Because of the potential for recovery problems, the amount of data accepted by a tape storage device has heretofore been limited. By limiting the data, it became a manageable task for the host initiator to recall the data from the tape storage device's buffer and attempt to rewrite that data, either to the same or to a different storage device. While the data size limitation made error recovery more practical, it severely limited the data throughput from an initiator host to a target tape storage device.

The interposition of an I/O bridge or gateway between a host initiator and a target storage device provides even more complications, as several host initiators may simultaneously be writing data to a particular tape storage device.

DISCUSSION OF THE RELATED ART

U.S. Pat. No. 5,327,535 for MAGNETIC RECORDING CONTROL APPARATUS, issued to Mikito Ogata, et al., describes an apparatus for creating virtual tape drives within a peripheral device. The purpose of the OGATA, et al. apparatus is to improve speed and efficiency in transferring data to a magnetic tape storage system. Unlike the method of the instant invention, conventional early write status is presented to an initiator host before the actual writing of the data to physical media, just as if the virtual drive were a prior art, physical tape storage device. This present slightly early write status method is a function of an I/O bridge, typically in a SAN, wherein data is transferred from a host initiator on a first bus to a target storage device on a second bus. The inventive method optimizes the data transfer rate through the I/O bridge. The OGATA, et al. virtual tape storage device, of course, could be used as a target storage device with the slightly early write method of the invention.

U.S. Pat. No. 5,668,971 for POSTED DISK READ OPERATIONS PERFORMED BY SIGNALING A DISK READ COMPLETE TO THE SYSTEM PRIOR TO COMPLETION OF THE DATA TRANSFER, issued to E. David Neufeld, teaches another method for providing status to a host before a physical data transfer operation is complete. NEUFELD teaches a method for blocking access to a particular block of memory to which a disk is transferring data, for the duration of the disk read operation. A "read complete" status may be posted upon issuance of a read command. No data may be transferred from the blocked memory until the data transfer is actually complete. This differs from the method of the instant invention in several ways. NEUFELD teaches a system operable for read operations from a disk driver. The inventive method, on the other hand, handles write operations to tape storage devices. NEUFELD's early completion status is used to call a task operating within the same system. The slightly early write completion status of the inventive system is used as a signal between two independent devices in an open system. NEUFELD blocks the next read access until total completion of the read in process. The inventive method allows the next write command to partially complete, prior to the total completion of a previous write command, thereby allowing overlapping of a first and a second tape write operation. NEUFELD teaches a memory subsystem while the present method teaches an attachment for a peripheral storage device.

It is, therefore, an object of the invention to provide a method and apparatus for use with sequential access and streaming devices attached to an I/O bridge or gateway.

It is a further object of the invention to provide a method and apparatus for use with sequential access and streaming devices attached to an I/O bridge or gateway, wherein a write complete status is provided to a host initiator prior to completion of the actual tape write operation.

It is yet another object of the invention to provide a method and apparatus for use with sequential access and streaming devices attached to an I/O bridge or gateway, wherein a second write command may be issued by a host initiator prior to completion of the actual tape write operation.

SUMMARY OF THE INVENTION

In accordance with the present invention, there is provided a method for improving data flow from a host initiator on a first data bus to a target tape storage or other sequential access device on a second data bus, both buses being connected to one another by an I/O bridge or gateway. The inventive method allows the I/O bridge to return a slightly early write completion status to a host initiator before the physical device write operation is complete. The host initiator may then issue an additional write command and data may actually be transferred to buffer memory of the I/O bridge before the first physical device write operation has been completed. This improves data throughput between host initiators and physical target storage devices, particularly in a storage area network (SAN).

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

The present invention provides a method for providing slightly early write completion status to a host initiator attached to a first data port on an I/O bridge or gateway from a tape storage device on a second data bus attached to the gateway.

Figure 1:
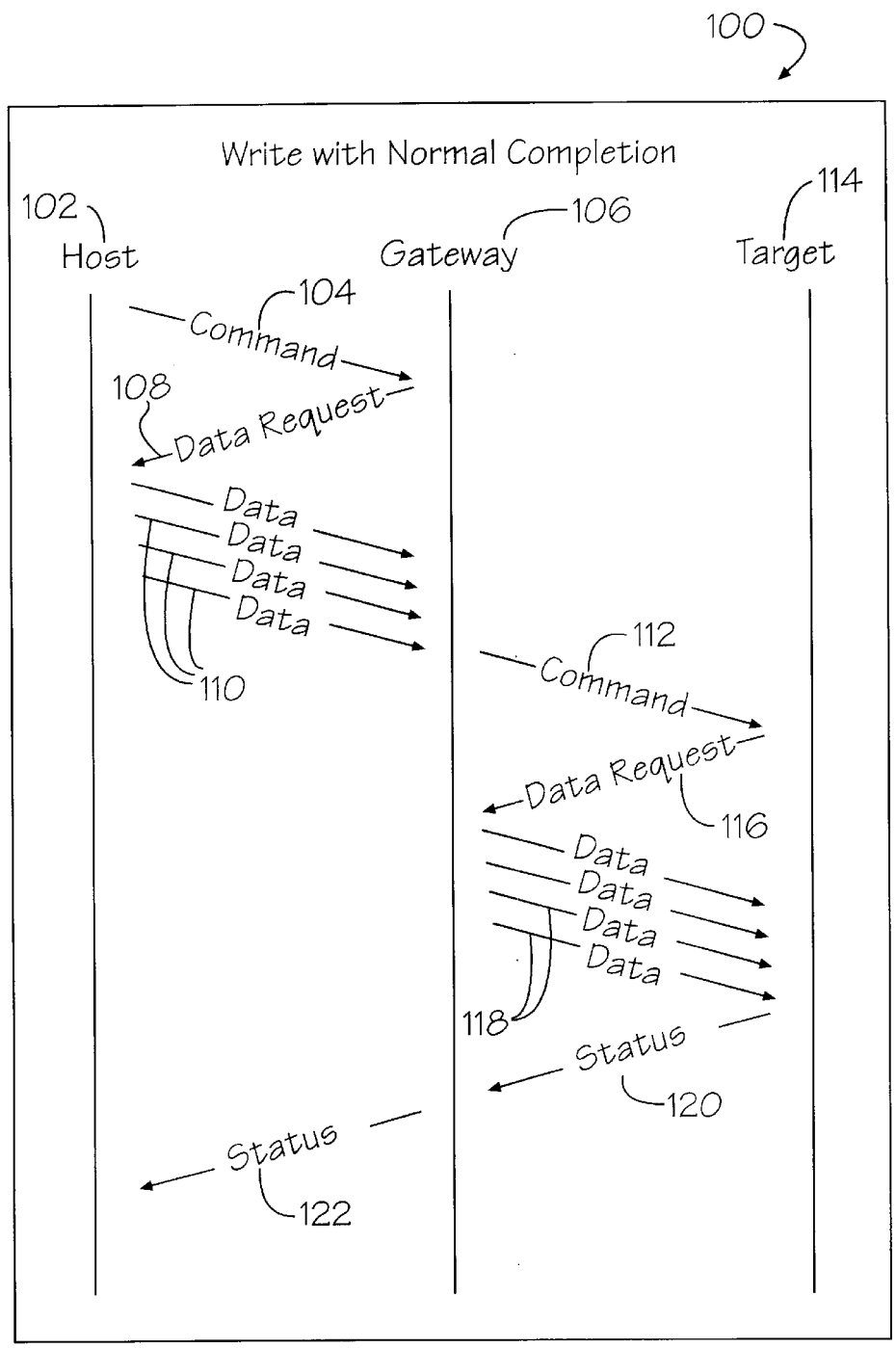
FIG. 1 is a schematic representation of prior art command/data flow from a host initiator to a target storage device through a gateway with normal write completion.

Referring first to FIG. 1, there is shown, generally at reference number 100, a schematic representation of two-way data and command flow between a host initiator (host) and a gateway as well as two-way communication between the gateway and a target storage device (target) of the prior art. A host 102 issues a first write command 104 to a gateway 106. Gateway 106 issues a data request command 108 to host 102. Host 102 then transfers data 110 to gateway 106. Data is stored in a buffer (not shown) in gateway 106. Upon completion of the transfer of data 110 from host 102, gateway 106 issues a write command 112 to target device 114. Target 114 responds to write command 112 by issuing a data request 116. Upon receipt of data request 116, gateway 106 begins transfer of the data previously stored in its buffer (not shown) 118 to target 114.

Upon completion of transferring data 118, target 114 issues a status 120 to gateway 106 which, in turn, issues status 122 to host 102. Because status 122 is delayed until actual completion of the data transfer to target 114, host 102 is delayed in its ability to issue its next write command. This prior art method assumes that data communication may take place on only one data bus at a time (i.e., between host 102 and gateway 106, or between gateway 106 and target 114).

Figure 2:
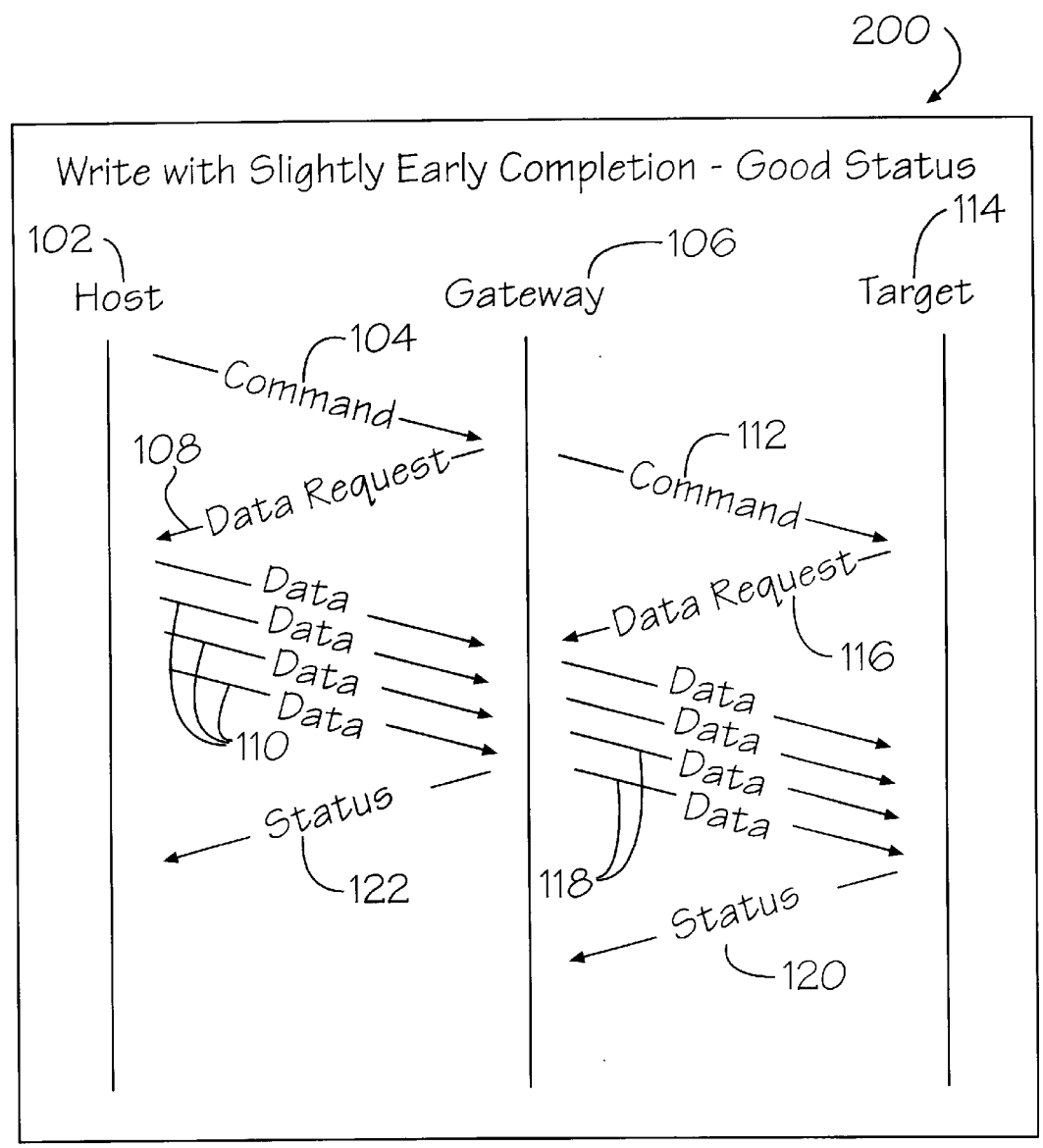
FIG. 2 is a schematic representation of command/data flow from a host initiator to a target storage device through a gateway with the inventive slightly early write completion "good" status.

Referring now to FIG. 2, there is shown a schematic representation, generally at reference number 200, of two-way data and command flow between a host and a gateway as well as two-way communication between the gateway and a target implementing the slightly early write completion of the present invention for a "good" status. Host 102 issues a first write command 104 to gateway 106. Gateway 106 immediately issues both a data request command 108 to host 102 and a write command 112 to target 114. Host 102 then transfers data 110 to gateway 106 where the data 110 is stored in a buffer (not shown).

Upon completion of the transfer of data 110 from host 102, and, once a transfer data request 116 has been received from target storage device 114, gateway 106 both begins transferring data 118 from its buffer (not shown) to target 114 and returns a "good" status 122 to host 102.

Target 114, upon receipt of write command 112, issues a data request 116 to gateway 106. Once gateway 106 has received data 110 from host 102, transfer of data 118 to target 114 is initiated. Upon completion of the transfer of data 118, target 114 issues a "good" status 120. Because the inventive slightly early write method allows simultaneous communication of both the input data bus (i.e., host 102) and the output data bus (i.e., target 114), the time between when host 102 issues write command 104 and when it receives status command 122 is greatly reduced. This allows host 102 to issue a subsequent write command much sooner than in the prior art method of FIG. 1. The method of FIG. 2 assumes that target 114 ultimately issues a "good" status 120.

Figure 3:
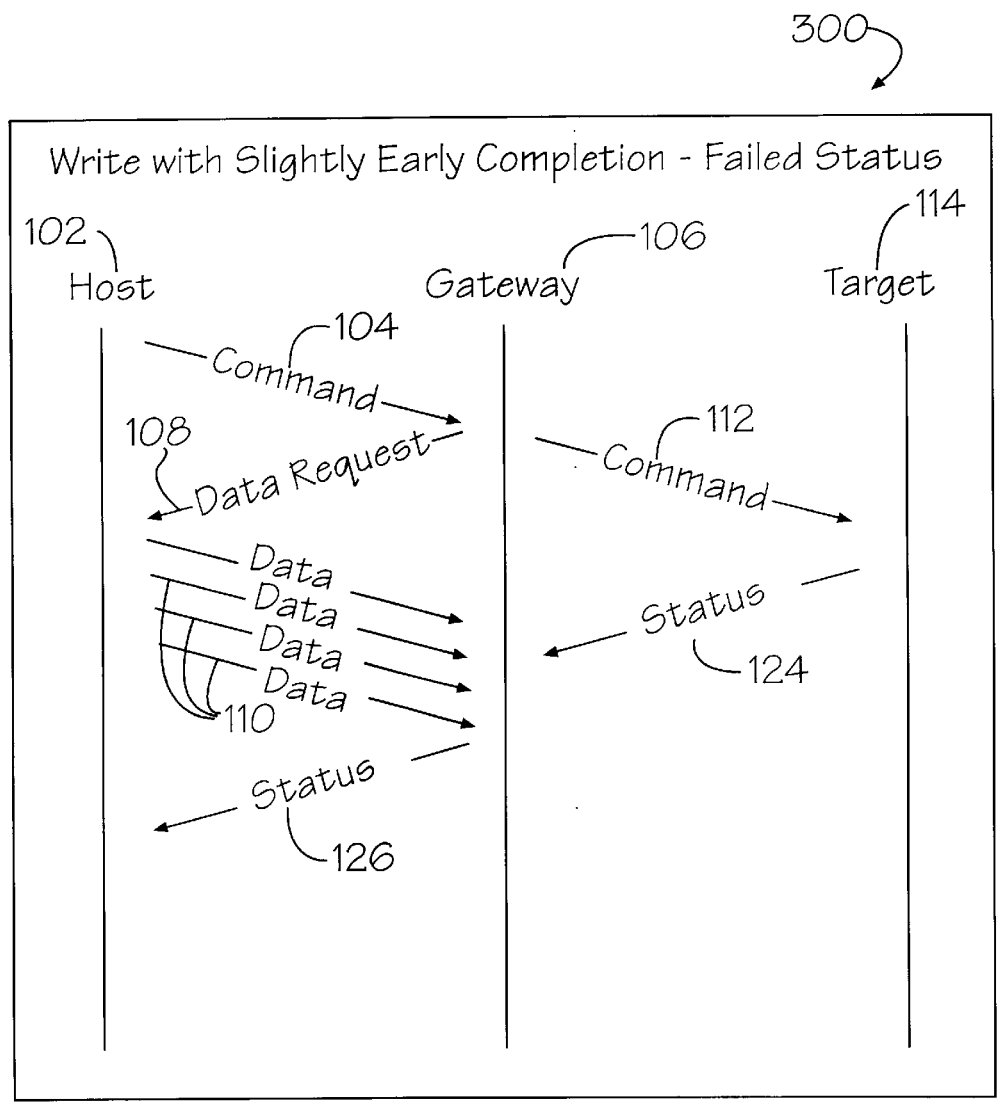
FIG. 3 is a schematic representation of command/data flow from a host initiator to a target storage device through a gateway with the inventive slightly early write completion "failed" status.

Referring now to FIG. 3, there is shown a schematic representation, generally at reference number 300, of two-way data and command flow between a host and a gateway as well as two-way communication between the gateway and a target, implementing the slightly early write completion of the present invention for a "failed" status. Host 102 issues a first write command 104 to gateway 106. Gateway 106 immediately issues both a data request command 108 to host 102 and a write command 112 to target 114. Host 102 then transfers data 110 to gateway 106 where the data 110 is stored in a buffer (not shown). Target 114 is assumed to be unavailable for accepting data. Upon receipt of write command 112, target 114 issues a "check condition" status 124 to gateway 106. Check condition status 126 is immediately returned to host 102. Again, host 102 receives status 126 far earlier than in prior art implementations and, therefore may begin recovery operations sooner. Also, all of the transferred data may still be available in a buffer (not shown) within gateway 106.

Figure 4:
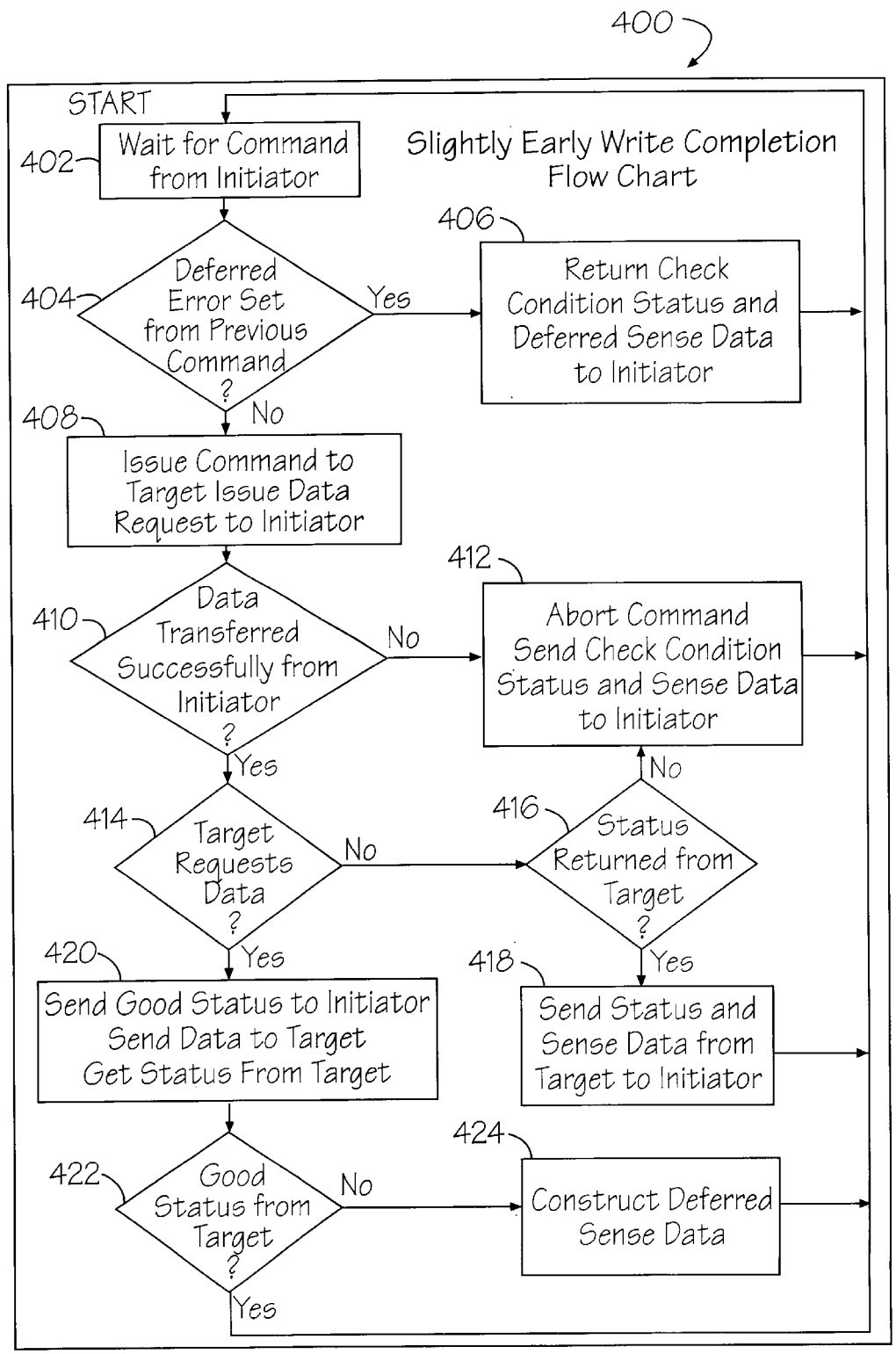
FIG. 4 is a flow chart of the slightly early write completion method of the invention.

Referring now to FIG. 4, there is shown a flow chart, generally at reference number 400, illustrating the inventive slightly early write completion method. For purposes of disclosure, the inventive method is assumed to be implemented in a gateway 106 (FIGS. 2, 3). Gateway 106 waits for a command from an initiator, step 402. Gateway 106 checks to determine whether a deferred error was previously posted, step 404. If a deferred error has been posted, Check Condition status and the deferred sense data is returned to the initiator, step 406. If, however, no deferred status is pending, step 404, a write command is issued to the target and a data request is issued to the initiator, step 408. Data transfer from the initiator is checked, step 410. If the transfer fails, the write command is aborted and Check Condition status and sense data is sent to the initiator, step 412. If the data has been successfully transferred from the initiator host, step 410, a check is made to determine whether a data request has been received from the target, step 414. If no data request has been received, step 414, a check is made to determine if the target has sent status, step 416. If status has not been sent by the target, step 416, control is transferred to step 412. If, however, the target has sent status, step 416, then the status from the target is forwarded to the host along with any sense data, step 418.

If a data request has been received from the target, step 414, good status is returned to the initiator, data is sent to the target, and status is awaited from the target, step 420. When status is received from the target, it is checked, step 422. If good status is received, control is returned to block 402 and the process awaits the next command from the initiator. If, however, the status from the target is not good, step 422, a deferred status is constructed and the attendant sense data is stored for later transmission to the host, step 424. Control is then returned to block 402.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for implementing early write completion in a system comprising an initiator host, a target storage device, and a gateway therebetween, the method comprising:
   upon receipt of a first command from an initiator host, determining, at the gateway, whether a deferred error condition has been saved and returning at least a "check condition" status to the initiator host, otherwise, issuing a data transfer request command to the initiator host and issuing a write command to the target storage device;
   at the gateway, receiving data from the initiator host, and aborting the write command and transmitting predetermined status information to the initiator host if transfer of the data from the initiator host fails;
   at the gateway, checking that the target storage device has requested data in response to the write command and, absent a data request, checking for status information from the storage device and aborting the write command absent the status from the target storage device and transmitting status information from the storage device to the initiator host;
   when the target storage device has requested data, sending from the gateway the data to the target storage device and, transmitting at least good status to the initiator host;
   the target storage device storing the data and transmitting status representative thereof
   receiving the status information from the target storage device and, saving deferred status information when the status is not good,
   whereby the initiator host receives an early write completed status upon receipt of all the data from the initiator host and independent of transmission of any of the data to the target storage device.

2. The method for implementing early write completion in a system comprising an initiator host, a target storage device, and a gateway therebetween as recited in claim 1, wherein the issuing a data transfer request command to the initiator host and issuing a write command to the target storage device occur substantially simultaneously.

3. The method for implementing early write completion in a system comprising an initiator host, a target storage device, and a gateway therebetween as recited in claim 1, further comprising:
   storing the data in a buffer.

4. The method for implementing early write completion in a system comprising an initiator host, a target storage device, and a gateway therebetween as recited in claim 3, wherein the gateway comprises the buffer.

5. The method for implementing early write completion in a system comprising an initiator host, a target storage device, and a gateway therebetween as recited in claim 4, wherein the target storage device comprises a tape storage device.

6. The method for implementing early write completion in a system comprising an initiator host, a target storage device, and a gateway therebetween as recited in claim 3, wherein the early write completed status is returned to the initiator host after the data from the initiator host is stored in the buffer and before transmission of the data from the buffer to the target storage device has begun.

7. The method for implementing early write completion in a system comprising an initiator host, a target storage device, and a gateway therebetween as recited in claim 3, wherein the early write completed status is returned to the initiator host after the data from the initiator host is stored in the buffer and after transmission the data from the buffer to the target storage device has begun.

8. The method for implementing early write completion in a system comprising an initiator host, a target storage device, and a gateway therebetween as recited in claim 3, wherein the data in the buffer is discarded when the target storage device in unable to accept the data.

9. A system for implementing an early write completion status check, comprising:
   a) an initiator host operatively connected to a first data bus for originating data to be stored, for transmitting the data on the first data bus, and for receiving status information from the first data bus;
   b) a storage device operatively connected to a second data bus and adapted to receive data therefrom, and to transmit status information representative of a predetermined condition of the storage device and a data transfer request on the second data bus; and
   c) a bridge device external to, and operatively connected with, the first data bus and the second data bus and adapted to receive the data from the initiator host on the first data bus, and to transmit the data to the target storage device on the second data bus, wherein the bridge device is further adapted to receive the status information from the storage device on the second data bus and for transmitting the status information to the initiator on the first data bus;
   wherein the bridge device is further configured to provide the initiator host with an early write completed status from the bridge device prior to completion of transmission of the data to the target storage device and after receiving a data request signal from the target storage device, and wherein data read or write operations for the storage device are not initiated by a bus master; and
   wherein the bridge device further comprises a device for receiving status information from the target storage device, creating deferred status information and storing the deferred status information.

10. The system for implementing an early write completion status check as recited in claim 9, wherein the bridge device comprises a buffer for storing the data from the host initiator.

11. The system for implementing an early write completion status check as recited in claim 10, wherein after a predetermined amount of the data from the host initiator is stored in the buffer and the data transfer request has been received from the target storage device, the early write completed status is returned to the initiator host.

12. The system for implementing an early write completion status check as recited in claim 11, wherein after a predetermined amount of the data from the host initiator is stored in the buffer and the data transfer request has been received from the target storage device, the early write completed status is returned to the initiator host before any of the data in the buffer is transmitted to the target storage device.

13. A system for implementing an early write completion status check, comprising:

a) an initiator host operatively connected to a first data bus for originating data to be stored, for transmitting the data on the first data bus, and for receiving status information from the first data bus;

b) a storage device operatively connected to a second data bus and adapted to receive data therefrom, and to transmit status information representative of a predetermined condition of the storage device and a data transfer request on the second data bus; and c) a bridge device external to, and operatively connected with, the first data bus and the second data bus and adapted to receive the data from the initiator host on the first data bus, and to transmit the data to the target storage device on the second data bus, wherein the bridge device is further adapted to receive the status information from the storage device on the second data bus and for transmitting the status information to the initiator on the first data bus;

wherein the bridge device is further configured to provide the initiator host with an early write completed status from the bridge device prior to completion of transmission of the data to the target storage device and after receiving a data request signal from the target storage device, and wherein data read or write operations for the storage device are not initiated by a bus master; and wherein the stored deferred status information is transmitted to the initiator host upon receipt of a command therefrom.

14. The system for implementing an early write completion status check as recited in claim 13, wherein the bridge device comprises a buffer for storing the data from the host initiator.

15. The system for implementing an early write completion status check as recited in claim 14, wherein after a predetermined amount of the data from the host initiator is stored in the buffer and the data transfer request has been received from the target storage device, the early write completed status is returned to the initiator host.

16. The system for implementing an early write completion status check as recited in claim 15, wherein after a predetermined amount of the data from the host initiator is stored in the buffer and the data transfer request has been received from the target storage device, the early write completed status is returned to the initiator host before any of the data in the buffer is transmitted to the target storage device.

* * * * *